(12) United States Patent
Edirisooriya (10) Patent No.: US 7,318,190 B2
(45) Date of Patent: Jan. 8, 2008

(54) STORAGE DEVICE PARITY COMPUTATION

(75) Inventor: Samanatha J. Edirisooriya, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 412 days.

(21) Appl. No.: 10/866,414

(22) Filed: Jun. 10, 2004

(65) Prior Publication Data

US 2005/0278612 A1    Dec. 15, 2005

(51) Int. Cl.
*G06H 11/00* (2006.01)
(52) U.S. Cl. .................... 714/800; 711/114
(58) Field of Classification Search .............. None
See application file for complete search history.

(56) References Cited

U.S. PATENT DOCUMENTS

| | | | |
|---|---|---|---|
| 5,146,588 A | | 9/1992 | Crater et al. |
| 5,271,012 A | | 12/1993 | Blaum et al. |
| 5,579,475 A | | 11/1996 | Blaum et al. |
| 6,012,123 A | | 1/2000 | Pecone et al. |
| 6,098,191 A | * | 8/2000 | Yamamoto et al. ......... 714/766 |
| 6,101,615 A | | 8/2000 | Lyons |
| 6,138,125 A | | 10/2000 | DeMoss |
| 6,158,017 A | * | 12/2000 | Han et al. .................. 714/6 |
| 6,247,157 B1 | | 6/2001 | Edirisooriya |
| 6,526,477 B1 | * | 2/2003 | Yuan et al. ................ 711/114 |
| 6,665,773 B1 | | 12/2003 | McCombs |
| 6,742,137 B1 | * | 5/2004 | Frey, Jr. ................... 714/6 |
| 6,871,317 B1 | | 3/2005 | Corbett |
| 7,047,358 B2 | | 5/2006 | Lee et al. |
| 7,080,278 B1 | | 7/2006 | Kleiman et al. |
| 7,188,270 B1 | | 3/2007 | Nanda et al. |
| 7,188,303 B2 | * | 3/2007 | Schmisseur ................. 714/801 |
| 2003/0126523 A1 | | 7/2003 | Corbett et al. |
| 2005/0050384 A1 | * | 3/2005 | Horn ....................... 714/6 |
| 2005/0108292 A1 | | 5/2005 | Burton et al. |

OTHER PUBLICATIONS

Blaum, M., J. Brady, J. Bruck, and J. Menon, "EVENODD: An Efficient Scheme for Tolerating Double Disk Failures in RAID Architectures", IEEE Transactions on Computers, vol. 44, No. 2, Feb. 1995, pp. 192-202.

Burkhard, W.A. and J. Menon, "Disk Array Storage System Reliability", Proceedings of the Symposium of Fault-Tolerant Computing, 1993, pp. 432-441.

(Continued)

*Primary Examiner*—Guy Lamarre
*Assistant Examiner*—Sam Rizk
(74) *Attorney, Agent, or Firm*—Konrad Raynes & Victor LLP; Janaki K. Davda (57) ABSTRACT

Provided are a techniques for receiving a modification to at least one data block. Parity blocks that are to be computed for the at least one data block are determined. At least one common term for computations for the determined parity blocks is determined. A first parity block from the determined parity blocks is computed that generates intermediate parity results for the common term. A second parity block from the determined parity blocks is computed using the intermediate parity results.

18 Claims, 5 Drawing Sheets

OTHER PUBLICATIONS

Chen, P.M., E.K. Lee, G.A. Gibson, R.H. Katz, and D.A. Patterson, "RAID: High-Performance, Reliable Secondary Storage", ACM Computing Surveys, Val. 26, No. 2, Jun. 1994, pp. 145-185.

Gibson, G.A., L. Hellerstein, R.M. Karp, R.H. Katz, and D.A. Patterson, "Coding Techniques for Handling Failures in Large Disk Arrays", Technical Report UCB/CSD No. 88/477, EECS Department, University of California, Berkeley, 1998, pp. 1-29.

Park, C., "Efficient Placement of Parity an Data to Tolerate Two Disk Failures in Disk Array Systems", IEEE Transactions on Parallel and Distributed Systems, vol. 6, No. 11, Nov. 1995, pp. 1177-1184.

Patterson, D.A., G. Gibson, and R.H. Katz, "A Case for Redundant Arrays of Inexpensive Disks (RAID)", Proceedings of the ACM International Conference on Management of Data, 1989, pp. 109-116.

U.S. Appl. No. 10/866,406, filed Jun. 10, 2004, entitled "Mapping Data Blocks to Storage Blocks", invented by S.J. Edirisooriya.

PCT International Search Report and Written Opinion, Jun. 19, 2006, for International Application No. PCT/US2005/016554.

PCT International Preliminary Report on Patentability (IPRP), Dec. 28, 2006, for International Application No. PCT/US2005/016554.

* cited by examiner

STORAGE DEVICE PARITY COMPUTATION

BACKGROUND

Description of the Related Art

Conventional systems may include storage configurations with Redundant Array of Independent Disks (RAID) devices. There are several levels of RAID devices. For example, RAID devices Level 5 (RAID-5 devices) store parity information using a rotating parity array.

Parity information is used to check whether data that has been moved from one storage area to another storage area (e.g., within a storage device) or that has been transmitted between two components (e.g., two computers or two storage devices) has been lost or written over. In particular, an additional binary digit, the parity bit, is added to a group of bits that are moved together. Before the group of bits are sent, the bits in the group are counted, and, for odd parity, if the total number of bits is even, the parity bit is set to one, and the total number of bits transmitted adds up to an odd number (e.g., if the parity group is 101, the parity bit is set to one, and 1011 adds up to an odd number). If the total number of bits is odd, the parity bit is set to zero, and the total number of bits transmitted again forms an odd number (e.g., if the parity group is 100, the parity bit is set to zero, and 1000 adds up to an odd number). At the receiving end, each group of bits, along with the parity bit, is checked to see if the total number of bits adds up to an odd number, and, if so, transmission has occurred successfully. Alternatively, it is possible to use even parity, in which case the parity bit is set to one if the total number of bits is odd.

Redundant disk arrays, such as RAID devices Level 3 (RAID-3 devices) and RAID-5 devices, may be used to build highly available and reliable disk subsystems, which is described further in A. Patterson, G. A. Gibson, and R. Katz, "A case for redundant arrays of inexpensive disks," in Proc. SIGMOD Int. Conf. Data Management, Chicago, Ill., 1988, pp. 109-116. Typically, the exclusive-OR (XOR) of data from some number of disks is maintained on a redundant disk, and, in the event of a disk failure, the data on the failed disk may be reconstructed by performing the XOR operation on the data on the surviving disks, and writing this into a spare disk. The ⊕ symbol represents an XOR operation. With a two input XOR operation, for any two inputs, if either input is True (i.e., 1) (but not both), then the output is True (i.e., 1).

However, data may be lost if the second disk fails before the reconstruction is complete. In, for example, Burkhard and J. Menon, "Disk Array System Storage Reliability", International Symposium Fault-Tolerant Computing, pp. 432-441, 1993, it was shown that traditional disk arrays that can protect from the simultaneous loss of no more than one disk will prove to be inadequate by the year 2000.

Consequently, several techniques have been considered to design systems that will not lose data even when multiple disks fail simultaneously. These techniques are further described in, for example, I. Park, "Efficient placement of parity and data to tolerate two disk failures in disk array systems," IEEE Trans. Parallel and Distributed Systems, vol. 6, no. 11, pp. 1177-1184, November 1995; Blaum, J. Brady, J. Bruck and J. Menon, "EVENODD: An efficient scheme for tolerating double disk failures in RAID architectures," IEEE Trans. Computers, vol. 44, no. 2, pp. 192-202, February 1995; Blaum, J. Brady, J. Bruck and J. Menon, "Methods and means for encoding and rebuilding data contents up to two unavailable DASDSs in a DASD array using simple non-recursive diagonal and row parity," U.S. Pat. No. 5,579,475, issued November 1996; Blaum, H. Hao, R. Mattson and J. Menon, "Methods and means for encoding and rebuilding data contents up to two unavailable DASDSs in an array of DASDs," U.S. Pat. No. 5,271,012, issued December 1993; Gibson, L. Hellerstein, R. M. Karp, R. H. Katz, and D. A. Patterson, "Coding techniques for handling failures in large disk arrays," Report No. UCB/CSD 88/477, December 1988; and Edirisooriya, S "METHOD OF ENCODING DATA SIGNALS FOR STORAGE" U.S. Pat. No. 6,247,157, issued on Jun. 21, 2001.

RAID devices Level 6 (RAID-6 devices) are similar to RAID-5 but include a second parity scheme that is distributed across different drives. In particular, RAID-6 devices provide support for recovering from two disk failures by maintaining two sets of parity groups. These parity groups may be referred to as horizontal and diagonal parity. The parity groups are formed so that each data block is present in both parity groups. Consequently, when modifying a data block, it is necessary to update two parity blocks.

Notwithstanding existing techniques for resolving simultaneous multiple disk failures, there is a need in the art for improved parity computation.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Embodiments provide a mechanism to accelerate parity computation by storing intermediate parity information.

Figure 1:
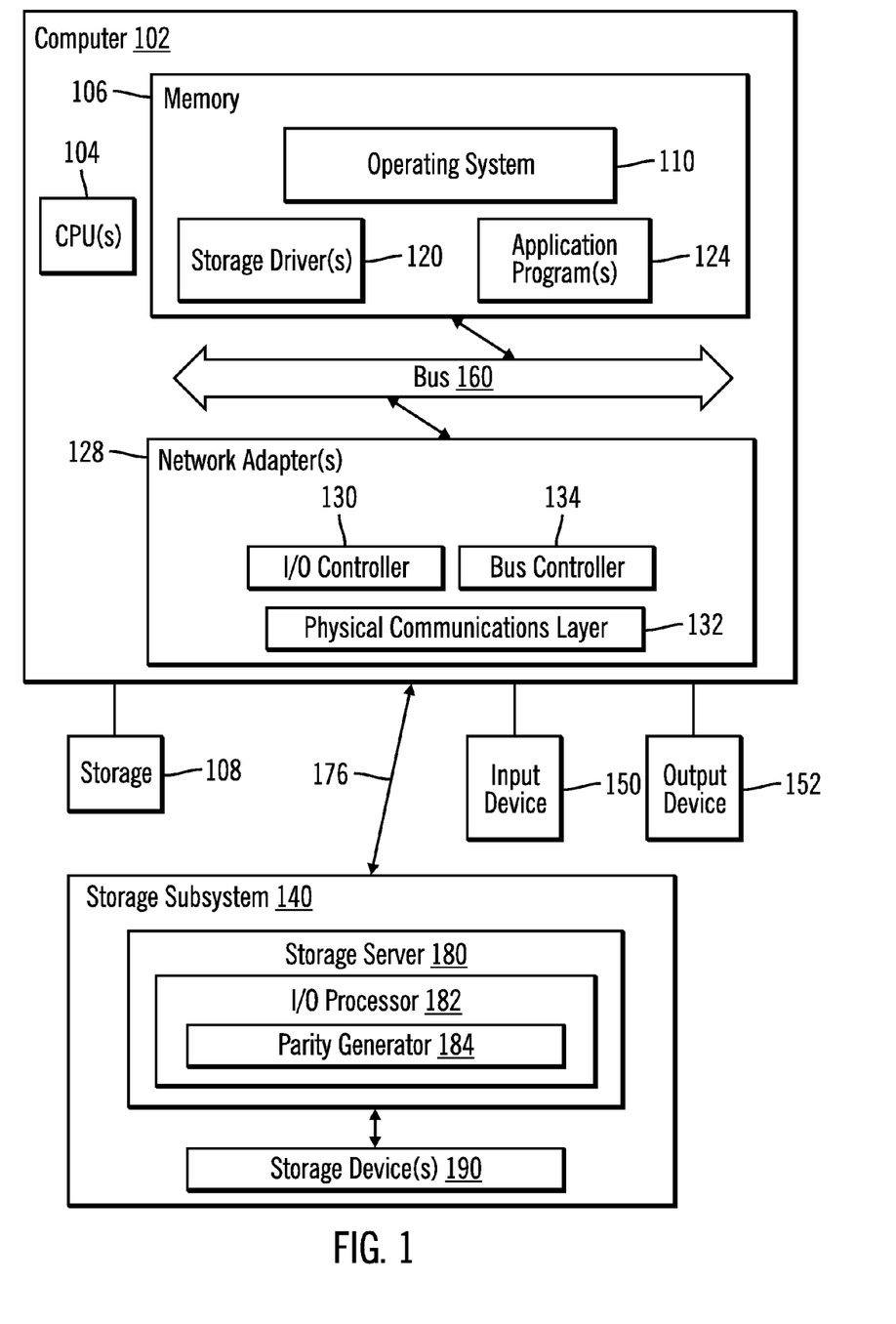
FIG. 1 illustrates details of a computing environment in accordance with certain embodiments.

FIG. 1 illustrates details of a computing environment in accordance with certain embodiments. A host computer 102 includes one or more central processing units (CPUs) 104, a volatile memory 106, non-volatile storage 108 (e.g., magnetic disk drives, optical disk drives, a tape drive, etc.), an operating system 110, and one or more network adapters 128. One or more storage drivers 120 and one or more application programs 124 reside in memory 106 for execution by CPUs 104 and are capable of transmitting and retrieving packets from remote storage subsystem 140 over a connection 176.

The host computer 102 may comprise any computing device known in the art, such as a mainframe, server, personal computer, workstation, laptop, handheld computer, telephony device, network appliance, virtualization device, storage controller, etc. Any CPU 104 and operating system 110 known in the art may be used. Programs and data in memory 106 may be swapped into storage 108 as part of memory management operations. The connection 176 may comprise, for example, any type of network or any type of bus interface known in the art. The network may be, for example, a Storage Area Network (SAN), a Local Area Network (LAN), Wide Area Network (WAN), the Internet, an Intranet, etc. The bus interface may be, for example, any type of Peripheral Component Interconnect (PCI) bus (e.g., a PCI bus (PCI Special Interest Group, PCI Local Bus Specification, Rev 2.3, published March 2002), a PCI-X bus (PCI Special Interest Group, PCI-X 2.0a Protocol Specification, published 2002), or a PCI Express bus (PCI Special Interest Group, PCI Express Base Specification 1.0a, published 2002)), a Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc.

The storage subsystem 140 includes a storage server 180 (i.e., a type of computing device) connected to one or more storage devices 190. The storage devices 190 may each comprise a storage device or an array of storage devices, such as Direct Access Storage Devices (DASDs), Just a Bunch of Disks (JBOD), Redundant Array of Independent Disks (RAID), virtualization device, etc. The storage server 180 includes an I/O processor 182, which includes a parity generator 184. The parity generator 184 is capable of generating parity information in accordance with embodiments. In alternative embodiments, the parity generator 184 may be located at computer 102 or at another computing device connected to storage subsystem 140.

Each network adapter 128 includes various components implemented in the hardware of the network adapter 128. Each network adapter 128 is capable of transmitting and receiving packets of data over connection 176.

Each storage driver 120 includes network adapter 128 specific commands to communicate with each network adapter 128 and interface between the operating system 110 and each network adapter 128. Each network adapter 128 or storage driver 120 implements logic to process the packets, such as a transport protocol layer to process the content of messages included in the packets that are wrapped in a transport layer, such as Transmission Control Protocol (TCP) (IETF RFC 793, published September 1981) and/or Internet Protocol (IP) (IETF RFC 791, published September 1981), the Internet Small Computer System Interface (iSCSI) (IETF RFC 3347, published February 2003), Fibre Channel (American National Standards Institute (ANSI) X3.269-199X, Revision 012, Dec. 4, 1995), or any other transport layer protocol known in the art. The transport protocol layer unpacks a payload from the received Transmission Control Protocol/Internet Protocol (TCP/IP) packet and transfers the data to a storage driver 120 to return to an application program 124. Further, an application program 124 transmitting data transmits the data to a storage driver 120, which then sends the data to the transport protocol layer to package in a TCP/IP packet before transmitting over the connection 176.

A bus controller 134 enables each network adapter 128 to communicate on a computer bus 160, which may comprise any bus interface known in the art, such as a Peripheral Component Interconnect (PCI) bus (PCI Special Interest Group, PCI Local Bus Specification, Rev 2.3, published March 2002), Small Computer System Interface (SCSI) (American National Standards Institute (ANSI) SCSI Controller Commands-2 (SCC-2) NCITS.318:1998), Serial ATA ((SATA 1.0a Specification, published Feb. 4, 2003), etc. The network adapter 128 includes a network protocol for implementing a physical communication layer 132 to send and receive network packets to and from remote data storages over a connection 176. In certain embodiments, the network adapter 128 may implement the Ethernet protocol (IEEE std. 802.3, published Mar. 8, 2002), Fibre Channel protocol (American National Standards Institute (ANSI) X3.269-199X, Revision 012, Dec. 4, 1995) or any other network communication protocol known in the art.

The network adapter 128 includes an Input/Output (I/O) controller 130. In certain embodiments, the I/O controller 130 may comprise Internet Small Computer System Interface (iSCSI controllers), and it is understood that other types of network controllers, such as an Ethernet Media Access Controller (MAC) or Network Interface Controller (NIC), or cards may be used.

The storage 108 may comprise an internal storage device or an attached or network accessible storage. Programs in the storage 108 may be loaded into the memory 106 and executed by the CPU 104. An input device 150 is used to provide user input to the CPU 104, and may include a keyboard, mouse, pen-stylus, microphone, touch sensitive display screen, or any other activation or input mechanism known in the art. An output device 152 is capable of rendering information transferred from the CPU 104, or other component, such as a display monitor, printer, storage, etc.

Various structures and/or buffers (not shown) may reside in memory 106 or may be located in a storage unit separate from the memory 106 in certain embodiments.

Figure 2:
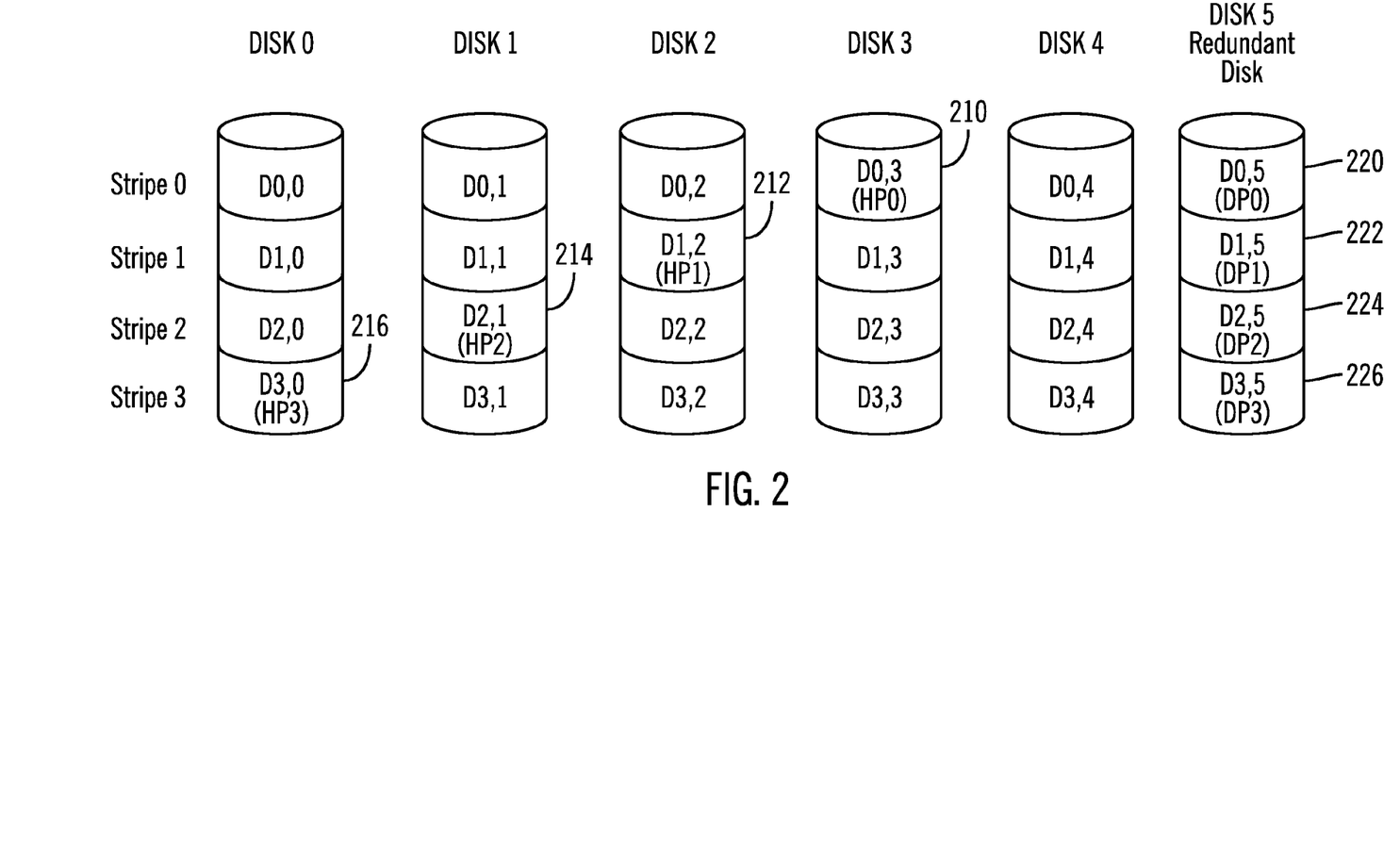
FIG. 2 illustrates disks and a technique for storing horizontal and diagonal parity information in accordance with certain embodiments.

FIG. 2 illustrates disks and a technique for storing horizontal and diagonal parity information described in U.S. Pat. No. 6,247,157 in accordance with certain embodiments. In FIG. 2, there are six disks, Disk 0, Disk 1, Disk 2, Disk 3, Disk 4, and Disk 5. A horizontal parity block is preceded with "HP" (for horizontal parity) (e.g., HP0 210, HP1 212, HP2 214, and HP3 216). A diagonal parity block is preceded with "DP" (for diagonal parity) (e.g., DP0 220, DP1 222, DP2 224, and DP3 226). The horizontal and diagonal parity blocks are spread over different disks in accordance with, for example, a technique described in U.S. Pat. No. 6,247,157, issued on Jun. 21, 2001. In this example, parity information is stored in blocks HP0 210, HP1 212, HP2 214, and HP3 216 and in blocks DP0 220, DP1 222, DP2 224, and DP3 226 so that data may be reconstructed even if two disks fail.

Also, in FIG. 2, there are four stripes, Stripe 0, Stripe 1, Stripe 2, and Stripe 3. Striping may be described as taking a physical contiguous section of separate disks and breaking them down into smaller pieces and logically interleaving them. With striping, an I/O operation can have several sub-tasks issued in parallel to the smaller pieces on the effected disk members. A data block is represented with a D (for data block), a stripe number, and a disk number. For example, D0,1 is a data block stored on stripe 0, disk 1.

In FIG. 2, RAID-6 parity information is generated for an array with six disks. The horizontal parity blocks HP0 210, HP1 212, HP2 214, and HP3 216 are computed as follows in accordance with certain embodiments:

$$HP0 = D0,3 = D0,0 \oplus D0,1 \oplus D0,2 \oplus D0,4$$

$$HP1 = D1,2 = D1,0 \oplus D1,1 \oplus D1,3 \oplus D1,4$$

$$HP2 = D2,1 = D2,0 \oplus D2,2 \oplus D2,3 \oplus D2,4$$

$$HP3 = D3,0 = D3,1 \oplus D3,2 \oplus D3,3 \oplus D3,4$$

The diagonal parity blocks DP0 220, DP1 222, DP2 224, and DP3 226 are computed as follows in accordance with certain embodiments:

$$DP0 = D0,5 = D3,4 \oplus D2,0 \oplus D1,1 \oplus D0,2$$

$$DP1 = D1,5 = D3,3 \oplus D2,4 \oplus D1,0 \oplus D0,1$$

$$DP2 = D2,5 = D3,2 \oplus D2,3 \oplus D1,4 \oplus D0,0$$

$$DP3 = D3,5 = D3,1 \oplus D2,2 \oplus D1,3 \oplus D0,4$$

When a data block, for instance data block D2,0, is to be modified, the horizontal and diagonal parity blocks for that data block D2,0 are re-computed. For data block D2,0, the horizontal parity block is HP2, and the diagonal parity block is DP0. The new horizontal parity HP2(new) is computed as follows in accordance with certain embodiments:

$$HP2(\text{new}) = D2,0(\text{old}) \oplus D2,0(\text{new}) \oplus HP2(\text{old})$$

The new diagonal parity DP0(new) is computed as follows in accordance with certain embodiments:

$$DP0(\text{new}) = D2,0(\text{old}) \oplus D2,0(\text{new}) \oplus DP0(\text{old})$$

Since the a common term (i.e., (D2,0 (old)⊕D2,0(new))) is present in both the new horizontal and diagonal parity block computations, embodiments increase the efficiency of new parity block computations by temporarily storing the common term.

Figure 3:
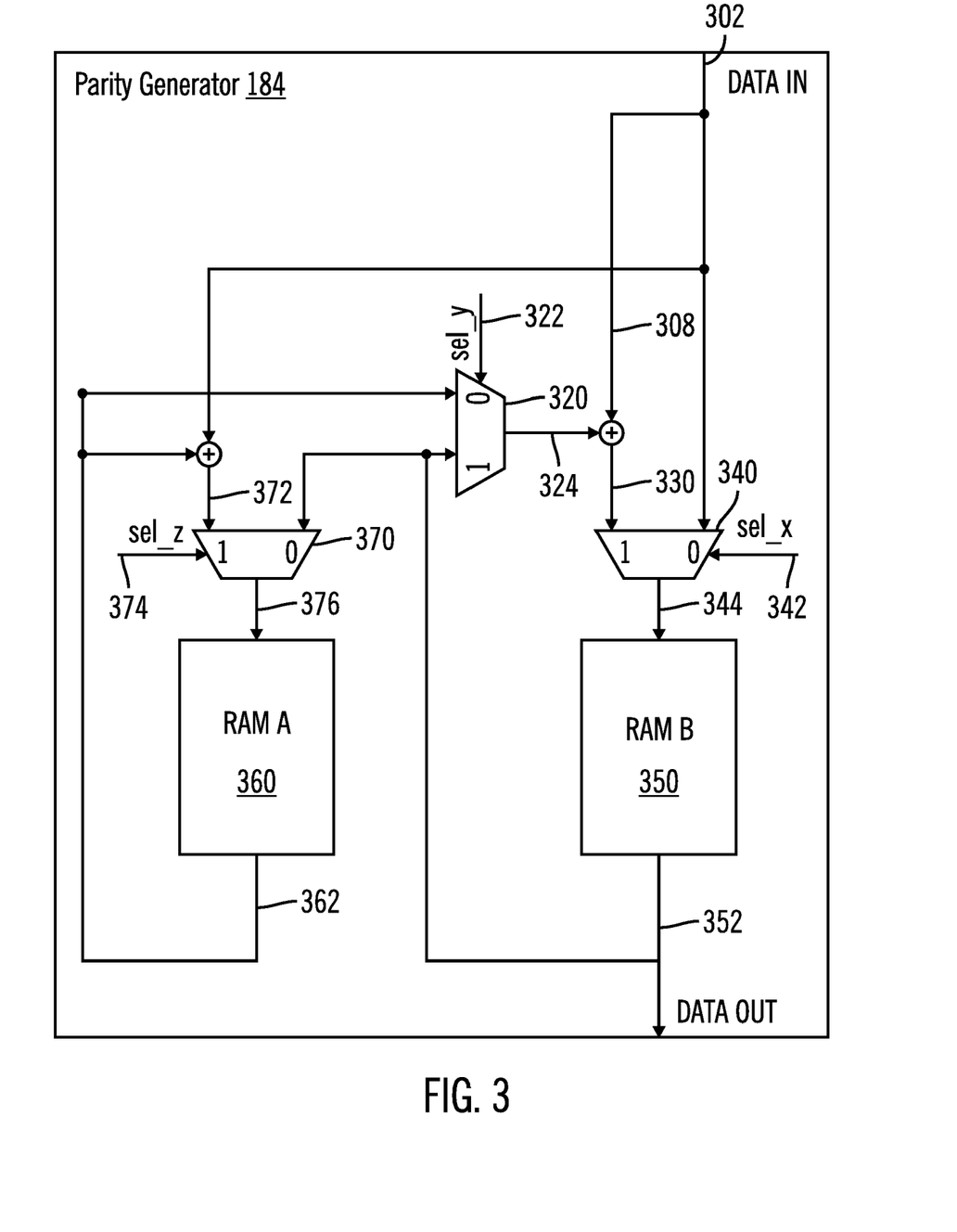
FIG. 3 illustrates a hardware block diagram of a parity generator in accordance with certain embodiments.

FIG. 3 illustrates a hardware block diagram of a parity generator 184 in accordance with certain embodiments. In FIG. 3, two Random Access Memory (RAM) blocks 350, 360 are used to temporarily hold data during parity computation. Thus, in order to take advantage of the term common to both horizontal and diagonal parity computations, embodiments use the two RAMs 350, 360, whereas many conventional systems use a single RAM for parity computation.

A line 302 provides input of existing data for a data block or new data for a data block to line 308 and to multiplexor 340. Multiplexor 340 receives as input data on line 302, data on line 330, and a value for variable sel_x on line 342. The output of multiplexor 340 on line 344 is input to RAM B 350. Multiplexor 320 receives as input data on line 362 (which is the output of RAM A 360), data on line 352 (which is the output of RAM B 350), and a value for variable sel_y on line 322. The data on line 308 and the output of multiplexor 320 on line 324 are input to an XOR gate that outputs data on line 330. Data on line 302 and data on line 362 are input to an XOR gate that outputs data on line 372. Then, multiplexor 370 receives as input data on line 372, data on line 352, and a value of variable sel_z on line 374. The output of multiplexor 370 on line 376 is input to RAM A 360. The values of variables variable sel_x, variable sel_y, and variable sel_z are determined by embodiments. In certain embodiments, the values of variables sel_x, sel_y, and sel_z may be zero, one, or "X", where "X" indicates that the value may be either zero or one.

In order to aid in understanding of embodiments, the following example is provided to compute a new horizontal parity (HP2(new)=D2,0 (old)⊕D2,0(new)⊕HP2(old)) and a new diagonal parity (DP0(new)=D2,0 (old)⊕D2,0(new)⊕ (DP0(old)) for data block D2,0, with reference to RAM A 360 and RAM B 350 of FIG. 3. Initially, data block D2,0 (old) (i.e., existing data for data block D2,0) is moved into RAM B 350, with sel_x=0, sel_y=X, and sel_z=X. Then, an XOR operation is performed on the contents of RAM B 350 with incoming data D2,0(new) (i.e., new data for data block D2,0), and the output of the XOR operation is stored back into RAM B 350, with sel_x=1, sel_y=1, and sel_z=X. At this time, RAM B 350 contains D2,0 (old)⊕D2,0(new).

Next, an XOR operation is performed on the contents of RAM B 350 with incoming data HP2(old) (i.e., the existing horizontal parity for data block D2,0), and the output of the XOR operation is stored back into RAM B 350, with sel_x=1, sel_y=1, and sel_z=0. Also, the contents of RAM B 350, before the XOR operation with incoming data HP2(old), are saved in RAM A 360, with sel_x=1, sel_y=1, and sel_z=0. At this time, RAM B 350 contains D2,0 (old)⊕D 2,0(new)⊕HP2(old), and RAM A 360 contains D2,0 (old)⊕D 2,0(new).

Then, data, which represents the new horizontal parity for data block D2,0, is moved out of RAM B 350. The horizontal parity may be stored as illustrated in FIG. 2. Then, an XOR operation is performed on the contents of RAM A 360 with incoming data DP0(old) (i.e., the existing diagonal parity for data block D2,0), and the output of the XOR operation is stored back into RAM B 350, with sel_x=1, sel_y=0, and sel_z=x. At this time, RAM B 350 contains D2,0 (old)⊕D2,0(new)⊕DP0(old). Then, data, which represents the new diagonal parity for data block D2,0, is moved out of RAM B 350. The diagonal parity may be stored as illustrated in FIG. 2.

Thus, the use of two storage areas (e.g., RAMs) saves time over a scheme that uses only one data RAM.

Figure 4:
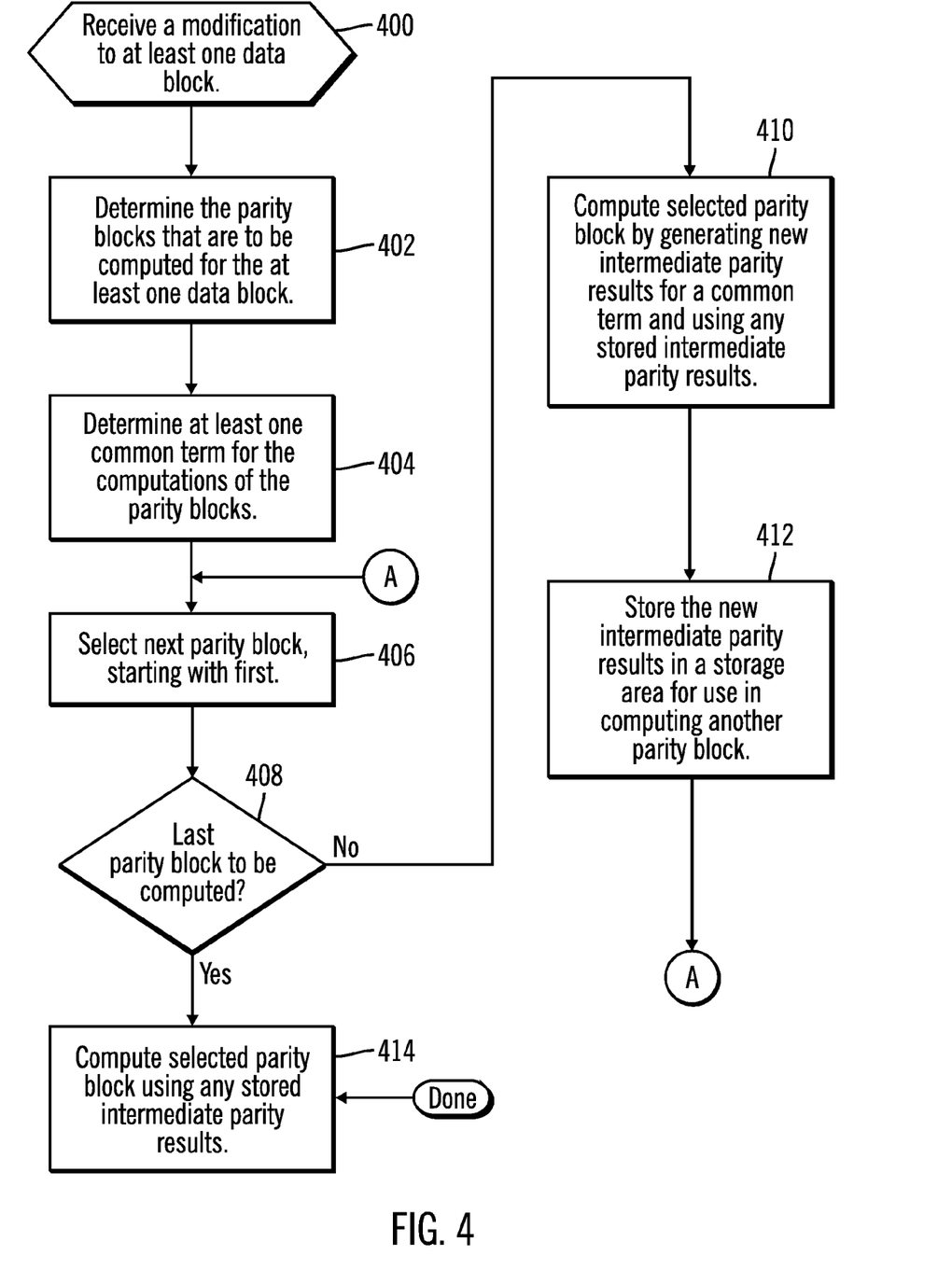
FIG. 4 illustrates operations to compute parity blocks in accordance with embodiments.

FIG. 4 illustrates operations to compute parity blocks in accordance with embodiments. Control begins at block 400 with receipt of a modification to at least one data block. In block 402, the parity generator 184 determines the parity blocks that are to be computed for the data blocks. In block 404, the parity generator 184 determines at least one common term for the computations of the parity blocks. In block 406, the parity generator 184 selects that next parity block, starting with the first. In block 408, the parity generator 184 determines whether the selected parity block is the last parity block to be computed. If so, processing continues to block 414, otherwise, processing continues to block 410.

In block 410, the parity generator 184 computes a selected parity block by generating new intermediate parity results for a common term while using any stored intermediate parity results. For the first parity block that is computed, intermediate parity results may not already be stored. In block 412, the parity generator 184 stores the new intermediate results in a storage area for use in computing another parity block. In block 414, for the last parity block to be computed, the parity block is computed using any stored intermediate parity results. In certain embodiments, for the last parity block, new intermediate parity results are not stored for use in computing another parity block.

Figure 5:
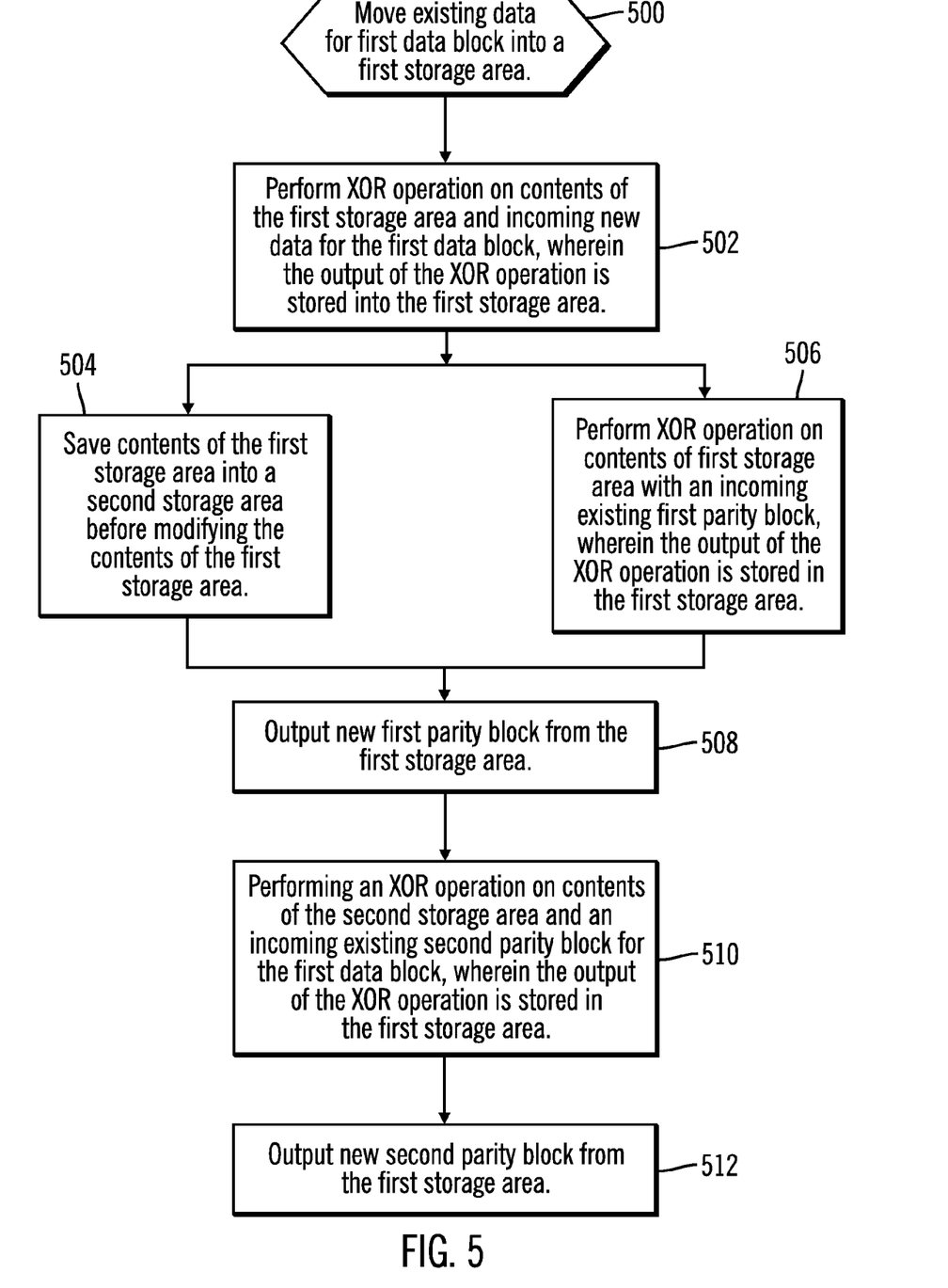
FIG. 5 illustrates operations to compute a first parity block and a second parity block for a data block in accordance with embodiments.

FIG. 5 illustrates operations to compute a first parity block and a second parity block for a data block in accordance with embodiments. With reference to FIG. 5, a first data block to be modified has existing data (i.e., data to which the modifications have not been applied), new data (i.e., data to which the modifications have been applied), an existing first (e.g., horizontal) parity block, and an existing second (e.g., diagonal) parity block. With this information, the parity generator 184 generates new first and second parity blocks.

Control begins at block 500 with the parity generator 184 moving existing data for a first data block that is being modified into a first storage area (e.g., RAM B 350). In block 502, the parity generator 184 performs an XOR operation on the contents of the first storage area and incoming new data for the first data block, and the output of the XOR operation is stored back into the first storage area. In block 604, the parity generator 184 saves the contents of the first storage area into a second storage area (e.g., RAM A 360) before modifying the contents of the first storage area with the processing of block 506. In block 506, the parity generator 184 performs and XOR operation on the contents of the first storage area with an incoming existing first parity block for the first data block, and the output of the XOR operation is stored back into the first storage area. The processing of blocks 504 and 506 may occur almost simultaneously. In block 508, a new first parity block for the first data block is output from the first storage area.

In block 510, the parity generator 184 performs an XOR operation on the contents of the second storage area and incoming existing second parity block for the firs data block, and the output of the XOR operation is stored into the first storage area. In block 512, a new second parity block is output for the first data block from the first storage area.

In order to aid in understanding of embodiments, another example is provided to compute parity blocks when multiple data blocks are modified. In particular, the use of two storage areas (e.g., RAMs) may be extended to improve performance when updating multiple data blocks. For instance, consider a scenario in which data blocks D2,2 and D2,3 are to be modified. To maintain correct parity information, the parity blocks HP2, DP2, and DP3 are recomputed. In order to take advantage of the term common to both horizontal and diagonal parity, two storage areas are used.

Initially, a data block D2,2 (old) (i.e., existing data for data block D2,2) is moved into RAM B 350, with sel_x=0, sel_y=X, and sel_z=X. Then, an XOR operation is performed on the contents of RAM B 350 with incoming data D2,2(new) (i.e., new data for data block D2,2), and the output of the XOR operation is stored back into RAM B 350, with sel_x=1, sel_y=1, and sel_z=X. At this time, RAM B contains D2,2 (old)⊕D2,2(new).

Next, an XOR operation is performed on the contents of RAM B 350 with incoming data DP3(old) (i.e., an existing diagonal parity for data block D2,2), and the output of the XOR operation is stores back into RAM B 350, with sel_x=1, sel_y=1, and sel_z=0. Also, the contents of RAM B 350, before the XOR operation with incoming data DP3(old), are saved in RAM A 360, with sel_x=1, sel_y=1, and sel_z=0. At this time, RAM B 350 contains D2,2 (old)⊕D2,2(new)⊕DP2(old), and RAM A 360 contains D2,2 (old)⊕D2,2(new). Then, data, which represents a new diagonal parity (DP3(new)), is moved out of RAM B 350.

Next, data block D2,3 (old) (i.e., existing data for data block D2,3) is moved into RAM B 350, with sel_x=0, sel_y=X, and sel_z=1. Also, an XOR operation is performed on the contents of RAM A 360 with the incoming data D2,3(new) (i.e., new data for data block D2,3), and the output of the XOR operation is stored back into RAM A 360, with sel_x=0, sel_y=X, and sel_z=1. At this time, RAM B 350 contains D2,3 (old), and RAM A contains D2,2 (old)⊕D2,2(new)⊕D2,3(old).

Then, an XOR operation is performed on the contents of RAM B 350 with incoming data (D2,3(new)) (i.e., new data for data block D2,3), and the output of the XOR operation is stored back into RAM B 350, with sel_x=1, sel_y=1, and sel_z=1. At this time, RAM B 350 contains D2,3 (old)⊕D2,3(new), and RAM A contains D2,2 (old)⊕D2,2(new)⊕D2,3 (old)⊕D2,3(new).

An XOR operation is performed on the contents of RAM B 350 with incoming data DP2(old) (i.e., an existing parity block for data block D2,3), and the output of the XOR operation is stored back into RAM B 350, with sel_x=1, sel_y=1, and sel_z=x. At this time, RAM B 350 contains D2,3 (old)⊕D2,3(new)⊕DP2(old), and RAM A 360 contains D2,2 (old)⊕D2,2(new)⊕D2,3 (old)⊕D2,3(new). Data, which represents the new diagonal parity (DP2(new)), is moved out of RAM B 350.

An XOR operation is performed on the contents of RAM B 350 with incoming data HP2(old) (i.e., existing horizontal parity for data blocks D2,2 and D2,3), and the output of the XOR operation is stored into RAM A 360, with sel_x=1, sel_y=0, and sel_z=X. At this time, RAM A 360 contains D2,2 (old)⊕D2,2(new)⊕D2,3(old)⊕D2,3(new)⊕HP2(old). Then, data, which represents the new horizontal parity (HP2(new)), is moved out of RAM B 350. When parity blocks are moved out of RAM B 350, they may be stored as indicated in FIG. 2.

Although the examples herein have provided a particular order of processing merely for ease of illustration, embodiments allow for parity blocks to be computed using processing with fewer, more or different processing than that illustrated using two storage areas.

The use of two storage areas (e.g., RAMs) improves performance over a scheme that uses only one RAM. For example, if one RAM is used, then fourteen processes are used to compute and update the parity blocks, whereas if two RAMs are used, then twelve processes are used to compute and update the parity blocks.

In general, if there are N disks in a disk array, then each horizontal and diagonal parity group has N−2 data blocks. Now, if U (<N−1) data blocks in a horizontal or diagonal parity group are to be updated, then the horizontal (or diagonal) parity blocks and U corresponding diagonal (or horizontal) parity blocks may be computed and updated in 4U+2 processes using embodiments utilizing two storage areas, as opposed to 5U+2 required by schemes with one data RAM.

Thus, embodiments provide a technique for efficiently supporting Raid-6 parity computations.

ADDITIONAL EMBODIMENT DETAILS

The described embodiments may be implemented as a method, apparatus or article of manufacture using programming and/or engineering techniques to produce software, firmware, hardware, or any combination thereof. The terms "article of manufacture" and "circuitry" as used herein refers to a state machine, code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. When the code or logic is executed by a processor, the circuitry may include the medium including the code or logic as well as the processor that executes the code loaded from the medium. The code in which embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration, and that the article of manufacture may comprise any information bearing medium known in the art.

The illustrated operations of FIGS. 4 and 5 show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or limiting. Many modifications and variations are possible in light of the above teachings.

What is claimed is:

1. A method for computing parity information, comprising:
   receiving a modification to at least one data block;
   determining parity blocks that are to be computed for the at least one data block;
   determining at least one common term for computations for the determined parity blocks;
   computing a horizontal parity block from the determined parity blocks that generates intermediate parity results for the common term, including computing the horizontal parity block in a first storage area at an Input/Output processor of a storage server and storing the intermediate parity results in a second storage area coupled to the first storage area at the Input/Output processor, wherein the storage server is coupled to a host; and
   computing a diagonal parity block from the determined parity blocks using the intermediate parity results in the second storage area.

2. The method of claim 1, further comprising:
   computing a last parity block from the determined parity blocks without storing the intermediate parity results.

3. The method of claim 1, wherein the horizontal parity block is computed in a first Random Access Memory (RAM) and wherein the intermediate parity results are stored in a second Random Access Memory (RAM).

4. The method of claim 1, wherein the at least one data block is a first data block, wherein the horizontal parity block is a new horizontal parity block, and wherein computing the new horizontal parity block further comprises:
   moving existing data for the first data block into the first storage area;
   performing an exclusive-or operation on contents of the first storage area and new data for the first data block, wherein the output of the exclusive-or operation is stored into the first storage area;
   storing the contents of the first storage area into the second storage area;
   performing an exclusive-or operation on the contents of the first storage area with an existing horizontal parity block for the first data block, wherein the output of the exclusive-or operation is stored into the first storage area; and
   outputting the new horizontal parity block for the first data block from the first storage area.

5. The method of claim 4, wherein the diagonal parity block is a new diagonal parity block and wherein computing the new diagonal parity block further comprises:
   performing an exclusive-or operation on contents of the second storage area and an existing diagonal parity block for the first data block, wherein the output of the exclusive-or operation is stored in the first storage area; and
   outputting the new diagonal parity block for the first data block from the first storage area.

6. An article of manufacture for computing parity information, wherein the article of manufacture comprises a computer readable medium storing instructions, and wherein the article of manufacture is operable to:
   receive a modification to at least one data block;
   determine parity blocks that are to be computed for the at least one data block;
   determine at least one common term for computations for the determined parity blocks;
   compute a horizontal parity block from the determined parity blocks that generates intermediate parity results for the common term, including computing the horizontal parity block in a first storage area at an Input/Output processor of a storage server and storing the intermediate parity results in a second storage area coupled to the first storage area at the Input/Output processor, wherein the storage server is coupled to a host; and
   compute a diagonal parity block from the determined parity blocks using the intermediate parity results in the second storage area.

7. The article of manufacture of claim 6, wherein the article of manufacture is further operable to:
   compute a last parity block from the determined parity blocks without storing the intermediate parity results.

8. The article of manufacture of claim 6, wherein the horizontal parity block is computed in a first Random Access Memory (RAM) and wherein the intermediate parity results are stored in a second Random Access Memory (RAM).

9. The article of manufacture of claim 6, wherein the at least one data block is a first data block, wherein the horizontal parity block is a new horizontal parity block, and wherein the article of manufacture is further operable to:
   move existing data for the first data block into the first storage area;
   perform an exclusive-or operation on contents of the first storage area and new data for the first data block, wherein the output of the exclusive-or operation is stored into the first storage area;
   store the contents of the first storage area into the second storage area;
   perform an exclusive-or operation on the contents of the first storage area with an existing horizontal parity block for the first data block, wherein the output of the exclusive-or operation is stored into the first storage area; and
   output the new horizontal parity block for the first data block from the first storage area.

10. The article of manufacture of claim 9, wherein the diagonal parity block is a new diagonal parity block and wherein the article of manufacture is further operable to:
   perform an exclusive-or operation on contents of the second storage area and an existing diagonal parity block for the first data block, wherein the output of the exclusive-or operation is stored in the first storage area; and output the new diagonal parity block for the first data block from the first storage area.

11. A system for computing parity information, comprising:
   a first storage area at an Input/Output processor of a storage server;
   a second storage area at the Input/Output processor coupled to the first storage area;
   a host coupled to the storage server; and
   circuitry at the Input/Output processor operable to:
      compute a horizontal parity block that generates intermediate parity results for a common term, wherein the intermediate parity results are stored in the second storage area, wherein the horizontal parity block is computed in the first storage area, and wherein the horizontal parity block is output from the first storage area; and
      compute a diagonal parity block using the intermediate parity results in the second storage area.

12. The system of claim 11, wherein the circuitry is further operable to:
   receive a modification to at least one data block;
   determine parity blocks that are to be computed for the at least one data block; and
   determine at least one common term for computations for the determined parity blocks.

13. The system of claim 12, wherein the circuitry is further operable to:
   compute a last parity block from the determined parity blocks without storing the intermediate parity results.

14. The system of claim 11, wherein the first storage area is a first Random Access Memory (RAM) and wherein the second storage area is a second Random Access Memory (RAM).

15. The system of claim 11, wherein the at least one data block is a first data block, wherein the horizontal parity block is a new horizontal parity block, and wherein the circuitry is further operable to:
   move existing data for the first data block into the first storage area;
   perform an exclusive-or operation on contents of the first storage area and new data for the first data block, wherein the output of the exclusive-or operation is stored into the first storage area;
   store the contents of the first storage area into the second storage area;
   perform an exclusive-or operation on the contents of the first storage area with an existing horizontal parity block for the first data block, wherein the output of the exclusive-or operation is stored into the first storage area; and
   output the new horizontal parity block for the first data block from the first storage area.

16. The system of claim 15, wherein the diagonal parity block is a new diagonal parity block and wherein the circuitry is further operable to:
   perform an exclusive-or operation on contents of the second storage area and an existing diagonal parity block for the first data block, wherein the output of the exclusive-or operation is stored in the first storage area; and
   output the new diagonal parity block for the first data block from the first storage area.

17. A system, comprising:
   a first storage area at an Input/Output processor of a storage server that is capable of outputting a computed value for a parity block using any stored intermediate parity results, wherein the storage server is coupled to a host;
   a second storage area coupled to the first storage area at the Input/Output processor that is capable of storing intermediate parity results;
   a first line that is capable of transmitting data to a first exclusive-or gate;
   a second multiplexor that is capable of transmitting output to the first exclusive-or gate;
   a third multiplexor that is capable of receiving as input the output of the first exclusive-or gate, a variable, and input for a modified data block, and that is capable of outputting data to the first storage area; and
   a fourth multiplexor that is capable of receiving as input an output of the first storage area, a variable, and output of the second storage area, and that is capable of outputting data to the second storage area.

18. The system of claim 17, further comprising:
   means for computing a horizontal parity block that generates intermediate parity results for a common term, wherein the intermediate parity results are stored in the second storage area, and wherein the horizontal parity block is output from the first storage area; and
   means for computing a diagonal parity block using the intermediate parity results.

* * * * *